United States Patent
Winken et al.

(10) Patent No.: US 12,143,591 B2
(45) Date of Patent: Nov. 12, 2024

(54) MULTI-HYPOTHESIS PREDICTION

(71) Applicant: Fraunhofer-Gesellschaft zur Förderung der angewandten Forschung e.V., Munich (DE)

(72) Inventors: Martin Winken, Berlin (DE); Christian Bartnik, Berlin (DE); Philipp Helle, Berlin (DE); Mischa Siekmann, Belin (DE); Jonathan Pfaff, Berlin (DE); Detlev Marpe, Berlin (DE); Heiko Schwarz, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 212 days.

(21) Appl. No.: 17/815,200

(22) Filed: Jul. 26, 2022

(65) Prior Publication Data
US 2022/0360793 A1     Nov. 10, 2022

Related U.S. Application Data

(60) Division of application No. 17/145,050, filed on Jan. 8, 2021, now Pat. No. 11,641,473, which is a
(Continued)

(30) Foreign Application Priority Data

Jul. 10, 2018  (EP) .................................... 18182720

(51) Int. Cl.
*H04N 19/139*    (2014.01)
*H04N 19/109*    (2014.01)
(Continued)

(52) U.S. Cl.
CPC ......... *H04N 19/139* (2014.11); *H04N 19/109* (2014.11); *H04N 19/117* (2014.11);
(Continued)

(58) Field of Classification Search
CPC ..................................................... H04N 19/139
(Continued)

(56) References Cited

U.S. PATENT DOCUMENTS 6,807,231 B1 *   10/2004   Wiegand ................ H04N 19/51
                                                    375/E7.262
2013/0155973 A1 *  6/2013   Geirhofer ........... H04W 72/542
                                                    370/328
(Continued)

OTHER PUBLICATIONS

T. Wiegand et al.: Entropy-constrained linear vector prediction for motion-compensated video coding, Information Theory, Proceedings 1998 IEE International Symposium on Cambridge, Ma, USA Aug. 16-21, 1998, Jan. 1, 1998, p. 409, XP055624092, 1998.
(Continued)

*Primary Examiner* — Yulin Sun
(74) *Attorney, Agent, or Firm* — Perkins Coie LLP; Michael A. Glenn (57) ABSTRACT

A video encoder for encoding a video into a data stream using motion compensated prediction for inter predicted blocks, comprising a hypothesis number control, configured to control a number of prediction hypotheses of the inter predicted blocks within a predetermined portion of the video to meet a predetermined criterion.

9 Claims, 6 Drawing Sheets

Related U.S. Application Data continuation of application No. PCT/EP2019/068384, filed on Jul. 9, 2019.

(51) Int. Cl.
  *H04N 19/117* (2014.01)
  *H04N 19/137* (2014.01)
  *H04N 19/176* (2014.01)
  *H04N 19/57* (2014.01)
  *H04N 19/577* (2014.01)

(52) U.S. Cl.
  CPC ......... *H04N 19/137* (2014.11); *H04N 19/176* (2014.11); *H04N 19/57* (2014.11); *H04N 19/577* (2014.11)

(58) Field of Classification Search
  USPC .................................................. 375/240.02
  See application file for complete search history.

(56) References Cited

U.S. PATENT DOCUMENTS

| | | | |
|---|---|---|---|
| 2014/0044179 A1* | 2/2014 | Li | H04N 19/30 375/240.16 |
| 2019/0230350 A1* | 7/2019 | Chen | H04N 19/139 |

OTHER PUBLICATIONS

M. Flierl et al: Multihypothesis Motion Pictures for H.26L, 12th VCEG Meeting Jan. 2001, Eibsee, DE, Video Coding Experts Group of ITU-T SG.16, No. VCEG-L24, XP030003169, 2001.

K. Kondo et al, Memory bandwidth reduction MC filter, Mar. 2011, Geneva, ISO/IEC JTC1/SC29/WG11, KP030048211, 2011.

M. Winken et al.: CE10: Multi-hypothesis inter prediction (Tests 1.5-1.8)—11th JVET Meeting, Jul. 2018, Ljubljana, ISO/IEC JTC1/SC29/WG11 and ITU-T SG.16, No. JVET-K0269, XP030198744, 2018.

* cited by examiner

MULTI-HYPOTHESIS PREDICTION

CROSS-REFERENCES TO RELATED APPLICATIONS

This application is a divisional of U.S. patent application Ser. No. 17/145,050, filed Jan. 8, 2021, which is a continuation of copending International Application No. PCT/EP2019/068384, filed Jul. 9, 2019, which is incorporated herein by reference in its entirety, and additionally claims priority from European Application No. EP 18 182 720.5, filed Jul. 10, 2018, which is incorporated herein by reference in its entirety.

BACKGROUND OF THE INVENTION

The present application is concerned with video coding/decoding.

All relevant video coding standards, like AVC/H.264 or HEVC/H.265, follow the so-called hybrid approach, where predictive coding is combined with transform coding of the prediction residual. For generating the prediction signal, two possible modes are supported by these standards, namely INTRA prediction and INTER prediction. In AVC/H.264, the decision between these two modes can be made at macroblock (16×16 luma samples) level, and in HEVC/H.265 at Coding Unit (CU) level, which can be of varying size. In INTRA prediction, sample values of already reconstructed neighboring blocks of the current block can be used for generating the prediction signal. How this INTRA prediction signal is formed from the neighboring reconstructed sample values, is specified by the INTRA prediction mode. In INTER prediction, already reconstructed frames (in coding order) can be used for generating the prediction signal. For INTER prediction, in both AVC/H.264 and HEVC/H.265, either uni or bi prediction is used. For uni prediction, the prediction signal is a shifted and interpolated region of a so-called reference picture. The used reference picture is specified by the reference index and the location of the (possibly interpolated) region within the reference picture is specified (relatively to the current block) by the motion vector. The motion vector itself is predictively encoded relatively to a motion vector predictor, such that only the motion vector difference has to be actually encoded. In HEVC/H.265, the motion vector predictor is selected by transmitting a motion vector predictor index. In both AVC/H.264 and HEVC/H.265, motion vectors can be specified with an accuracy of a quarter pel (qpel). The process of generating such an (interpolated) prediction signal is also called motion-compensated prediction. In bi-prediction, two motion-compensated prediction signals ("hypotheses") are linearly superposed (typically using a factor of 0.5 for both constituent prediction signals). Therefore, for bi-prediction two reference indices and motion vector differences (and motion vector predictor indices, in HEVC/H.265) have to be transmitted.

Figure 1:
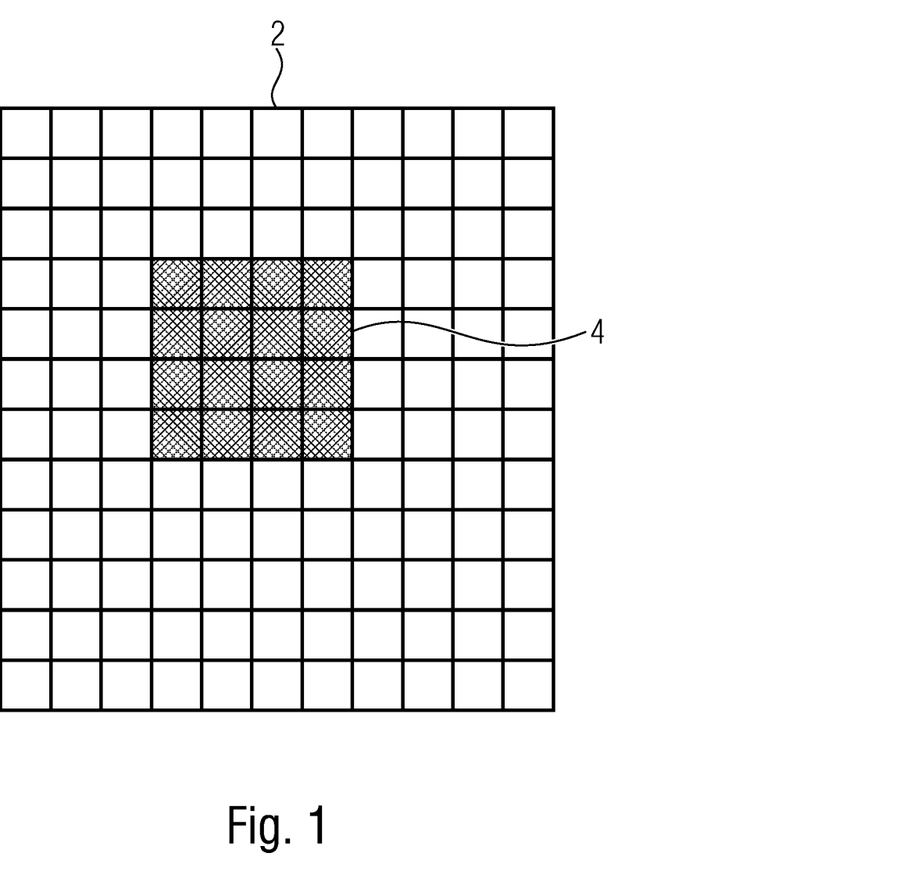
FIG. 1 shows the relative prediction memory access overhead in case of an 8-tap sub-pel interpolation filter, for the uni-prediction 4*4 luma block according to the conventional technology.

In order to improve coding efficiency, more than two prediction hypotheses can be used, however this comes at cost of a higher memory access bandwidth. The memory access bandwidth is measured in bit/s and gives the amount of data that has to be fetched from the reference picture buffer divided by the time interval during which this data is needed. The time interval could represent e.g., a slice, a picture, a group of pictures, or a whole video sequence. As an alternative measure, also the average number of reference picture sample which are requirements for generating one prediction signal can be used, where again the average can be computed, e.g., for one block, one slice, a group of pictures, or a whole video sequence. This measure could be called relative prediction memory access overhead. This overhead will be equal to one for full-pel uni-prediction and equal to two in case of full-pel bi-prediction. For uni-prediction, this overhead will be the largest in case of small blocks with sub-pel interpolation in both x/y components. Because a larger region than the (output) prediction block will have to be fetched from the reference picture memory for the sub-pel interpolation, and because the amount by which the fetched region is larger than the output block is constant, this impact is the greatest for small blocks. For example, in case of an 8-tap sub-pel interpolation filter (as used in HEVC/H.265), for the uni-prediction of a 4*4 luma block, up to (4+7)*(4+7) luma reference samples have to be accessed. The relative overhead would consequently be (4+7)*(4+7)/(4*4)≈7.6. This is illustrated as FIG. 1, the whole 11*11 area represents the area which has to be fetched from the reference picture 2 and the gray area 4 in the center represents (output) prediction block.

SUMMARY

An embodiment may have a video decoder for decoding a video from a data stream using motion compensated prediction for inter predicted blocks, including a hypothesis number control, configured to control a number of prediction hypotheses of the inter predicted blocks within a predetermined portion of the video to meet a predetermined criterion, wherein the predetermined criterion indicates a target mean number of prediction hypotheses per inter predicted block or a maximum number of the hypotheses for the inter predicted blocks within the predetermined portion.

Another embodiment may have a video decoder for decoding a video from a data stream using motion compensated prediction for inter predicted blocks, configured to determine a number of hypotheses for a predetermined inter predicted block dependent on a size or geometry of the block, wherein the number of hypotheses is determined by comparing an upper limit for the number N of hypotheses dependent on $(m*w*h)/((w+k_x)*(h+k_y))$, wherein m is a factor, w is a block width of the predetermined inter predicted block, h is a block height of the predetermined inter predicted block and $k_x$ and $k_y$ indicate the size of an interpolation filter used in the motion compensated prediction.

Another embodiment may have a method for decoding a video from a data stream using motion compensated prediction for inter predicted blocks, including a hypothesis number control, having the steps of: controlling a number of prediction hypotheses of the inter predicted blocks within a predetermined portion of the video to meet a predetermined criterion, wherein the predetermined criterion indicates a target mean number of prediction hypotheses per inter predicted block or a maximum number of the hypotheses for the inter predicted blocks within the predetermined portion.

Another embodiment may have a method for decoding a video from a data stream using motion compensated prediction for inter predicted blocks, having the steps of: determining a number of hypotheses for a predetermined inter predicted block dependent on a size or geometry of the block, wherein the number of hypotheses is determined by comparing an upper limit for the number N of hypotheses dependent on $(m*w*h)/((w+k_x)*(h+k_y))$, wherein m is a factor, w is a block width of the predetermined inter predicted block, h is a block height of the predetermined inter predicted block and $k_x$ and $k_y$ indicate the size of an interpolation filter used in the motion compensated prediction.

Another embodiment may have a non-transitory digital storage medium having a computer program stored thereon to perform the method for decoding a video from a data stream using motion compensated prediction for inter predicted blocks, including a hypothesis number control, having the steps of: controlling a number of prediction hypotheses of the inter predicted blocks within a predetermined portion of the video to meet a predetermined criterion, wherein the predetermined criterion indicates a target mean number of prediction hypotheses per inter predicted block or a maximum number of the hypotheses for the inter predicted blocks within the predetermined portion, when said computer program is run by a computer.

Another embodiment may have a non-transitory digital storage medium having a computer program stored thereon to perform the method for decoding a video from a data stream using motion compensated prediction for inter predicted blocks, having the steps of: determining a number of hypotheses for a predetermined inter predicted block dependent on a size or geometry of the block, wherein the number of hypotheses is determined by comparing an upper limit for the number N of hypotheses dependent on $(m*w*h)/((w+k_x)*(h+k_y))$, wherein m is a factor, w is a block width of the predetermined inter predicted block, h is a block height of the predetermined inter predicted block and $k_x$ and $k_y$ indicate the size of an interpolation filter used in the motion compensated prediction, when said computer program is run by a computer.

Another embodiment may have a data stream generated by a method for decoding a video from a data stream using motion compensated prediction for inter predicted blocks, including a hypothesis number control, having the steps of: controlling a number of prediction hypotheses of the inter predicted blocks within a predetermined portion of the video to meet a predetermined criterion, wherein the predetermined criterion indicates a target mean number of prediction hypotheses per inter predicted block or a maximum number of the hypotheses for the inter predicted blocks within the predetermined portion.

Another embodiment may have a data stream generated by a method for decoding a video from a data stream using motion compensated prediction for inter predicted blocks, having the steps of: determining a number of hypotheses for a predetermined inter predicted block dependent on a size or geometry of the block, wherein the number of hypotheses is determined by comparing an upper limit for the number N of hypotheses dependent on $(m*w*h)/((w+k_x)*(h+k_y))$, wherein m is a factor, w is a block width of the predetermined inter predicted block, h is a block height of the predetermined inter predicted block and $k_x$ and $k_y$ indicate the size of an interpolation filter used in the motion compensated prediction.

Another embodiment may have a video encoder for encoding a video into a data stream using motion compensated prediction for inter predicted blocks, including a hypothesis number control, configured to control a number of prediction hypotheses of the inter predicted blocks within a predetermined portion of the video to meet a predetermined criterion, wherein the predetermined criterion indicates a target mean number of prediction hypotheses per inter predicted block or a maximum number of the hypotheses for the inter predicted blocks within the predetermined portion.

Another embodiment may have a video encoder for encoding a video into a data stream using motion compensated prediction for inter predicted blocks, configured to determine a number of hypotheses for a predetermined inter predicted block dependent on a size or geometry of the block, wherein the number of hypotheses is determined by comparing an upper limit for the number N of hypotheses dependent on $(m*w*h)/((w+k_x)*(h+k_y))$, wherein m is a factor, w is a block width of the predetermined inter predicted block, h is a block height of the predetermined inter predicted block and $k_x$ and $k_y$ indicate the size of an interpolation filter used in the motion compensated prediction.

It is basic idea underlying the present invention that a coding efficiency increase is achievable by using more than two prediction hypotheses, while putting a limit on the resulting memory access bandwidth.

In accordance with embodiments of the present application, a number of prediction hypotheses of the inter predicted blocks within a predetermined portion of the video is controlled to meet a predetermined criterion. That is, the number of prediction hypotheses over a given area, e.g., a spatiotemporal area is controlled. By controlling the number of prediction hypotheses, it is possible to limit memory access bandwidth and as a result, coding efficiency is improved.

In accordance with embodiments of the present application, a number of hypotheses for a predetermined inter predicted block is determined dependent on a size or geometry of the block. By determining the number of hypotheses based on the size or geometry of the block, it is possible to keep the memory access bandwidth constant and therefore, coding efficiency is improved.

In accordance with embodiments of the present application, for supporting multi-hypothesis motion compensated prediction, using, for n-th hypotheses of inter predicted blocks, an interpolation filter size which depends on n. That is, different interpolation filters are used for different subsets of the prediction hypotheses, and therefore, the relative prediction memory access overhead for the subsequent hypotheses would be reduced.

In accordance with embodiments of the present application, for supporting multi-hypothesis motion compensated prediction, using, for n-th hypotheses of inter prediction block, a motion vector accuracy which depends on n. That is, different motion vector accuracies are used for different subsets of the prediction hypotheses, and therefore, in case of full-pel motion vector accuracy, the relative prediction memory access overhead for the subsequent hypotheses would be equal to one per hypotheses. Hence, it is possible to improve coding efficiency.

BRIEF DESCRIPTION OF THE DRAWINGS

Embodiments of the present invention will be detailed subsequently referring to the appended drawings, in which.

DETAILED DESCRIPTION OF THE INVENTION

The following description of the figures starts with a presentation of a description of video encoder and video decoder of a block-based predictive codec for coding pictures of a video in order to form an example for a coding framework into which embodiments for a composed prediction codec may be built in. The video encoder and video decoder are described with respect to FIGS. 2 to 4. Thereinafter the description of embodiments of the composed prediction concept of the present application are presented along with a description as to how such concepts could be built into the video encoder and decoder of FIGS. 2 and 3, respectively, although the embodiments described with the subsequent FIGS. 5 and following, may also be used to form video encoder and video decoders not operating according to the coding framework underlying the video encoder and video decoder of FIGS. 2 and 3.

Figure 2:
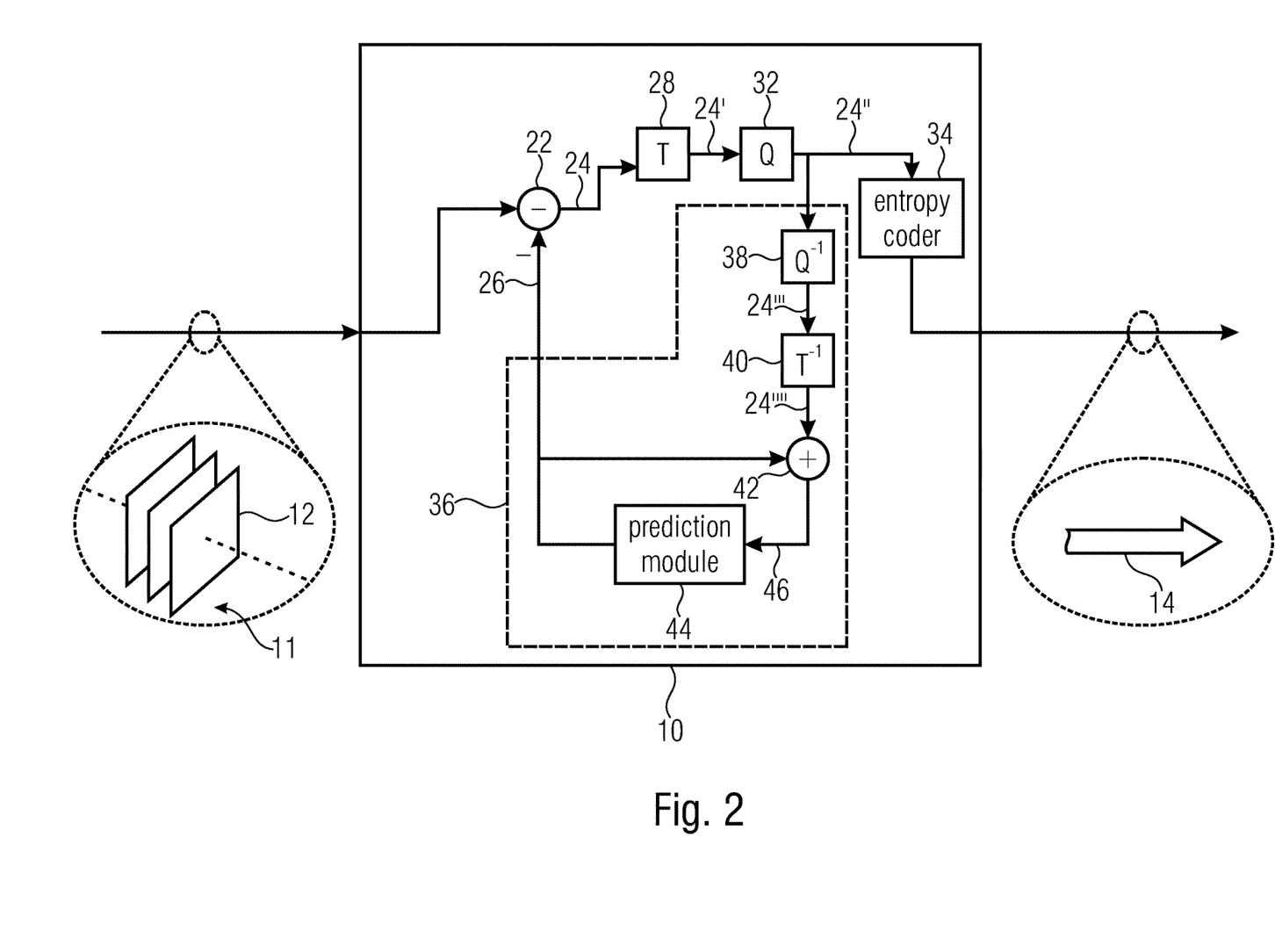
FIG. 2 shows a block diagram of an apparatus for predictively coding a video as an example for a video decoder where a composed prediction concept according to embodiments of the present application could be implemented.
Figure 3:
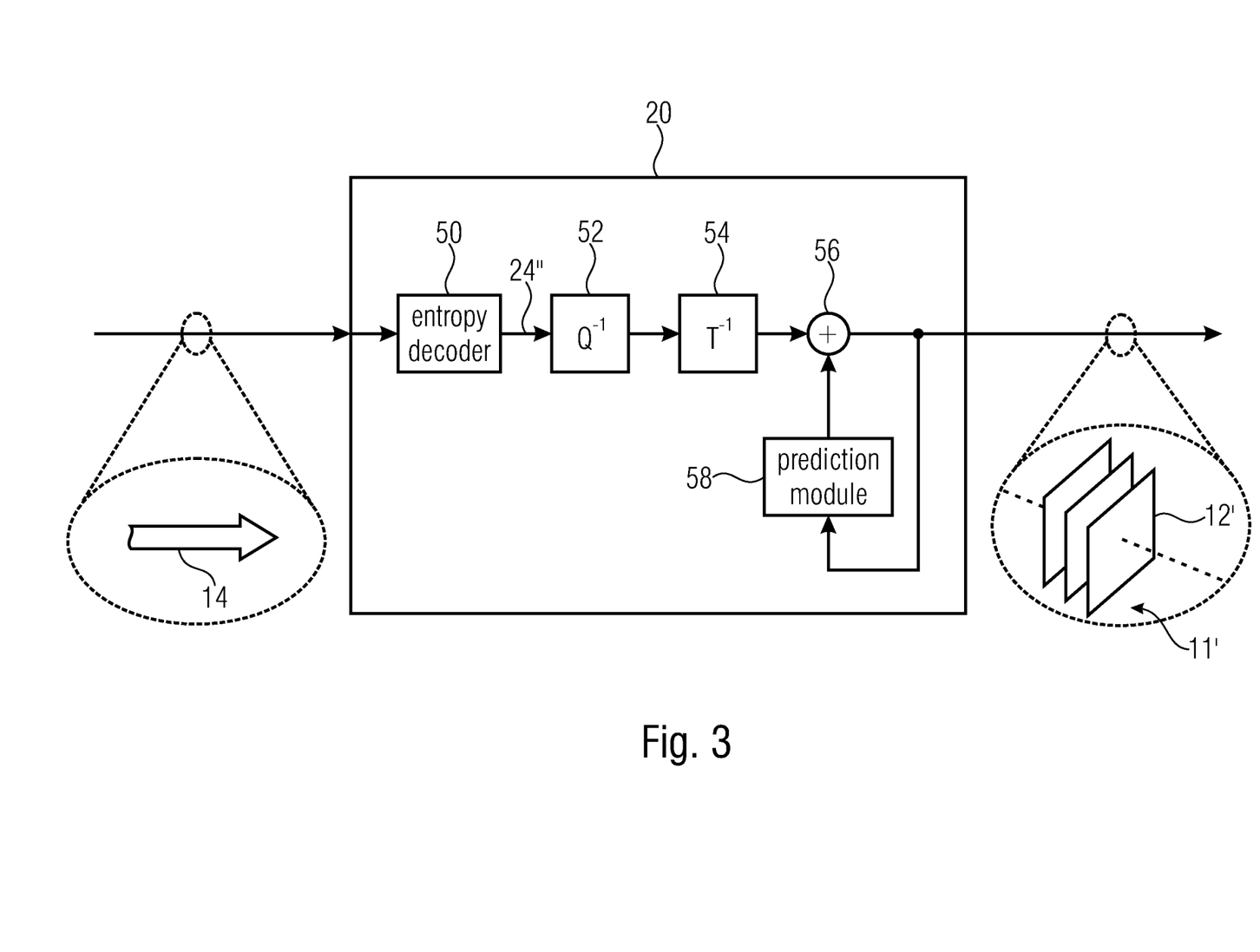
FIG. 3 shows a block diagram of an apparatus for predictively decoding a video, which fits to the apparatus of FIG. 2, as an example for a video decoder where a composed prediction concept according to embodiments of the present application could be implemented.

FIG. 2 shows an apparatus for predictively coding a video 11 composed of a sequence of pictures 12 into a data stream 14. Block-wise predictive coding is used to this end. Further, transform-based residual coding is exemplarily used. The apparatus, or encoder, is indicated using reference sign 10. FIG. 2 shows a corresponding decoder 20, i.e. an apparatus 20 configured to predictively decode the video 11' composed of pictures 12' in picture blocks from the data stream 14, also here exemplarily using transform-based residual decoding, wherein the apostrophe has been used to indicate that the pictures 12' and video 11', respectively, as reconstructed by decoder 20 deviate from pictures 12 originally encoded by apparatus 10 in terms of coding loss introduced by a quantization of the prediction residual signal. FIG. 2 and FIG. 3 exemplarily use transform based prediction residual coding, although embodiments of the present application are not restricted to this kind of prediction residual coding. This is true for other details described with respect to FIGS. 2 and 3, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into, and decodable from, data stream 14. To this end, the prediction stage 36 may internally, as is shown in FIG. 2, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'.

A prediction module 44 of prediction stage 36 then generates the prediction signal 26 on the basis of signal 46 by using, for instance, spatial prediction, i.e. intra prediction, and/or temporal prediction, i.e. inter prediction. Details in this regard are described in the following.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 3, the output of combiner 56 results in the reconstructed signal, namely the video 11'or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes which form a kind of set or pool of primitive prediction modes based on which the predictions of picture blocks are composed in a manner described in more detail below. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding, but details are set-out hereinafter. According to intra-coding mode, a prediction signal for a block is obtained on the basis of a spatial, already coded/decoded neighborhood of the respective block. Several intra-coding sub-modes may exist the selection among which, quasi, represents a kind of intra prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24″, data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream may comprise parameters controlling and signaling the subdivision of picture 12 and 12′, respectively, into the blocks. The decoder 20 uses these parameters to subdivide the picture in the same manner as the encoder did, to assign the same prediction modes and parameters to the blocks, and to perform the same prediction to result in the same prediction signal.

Figure 4:
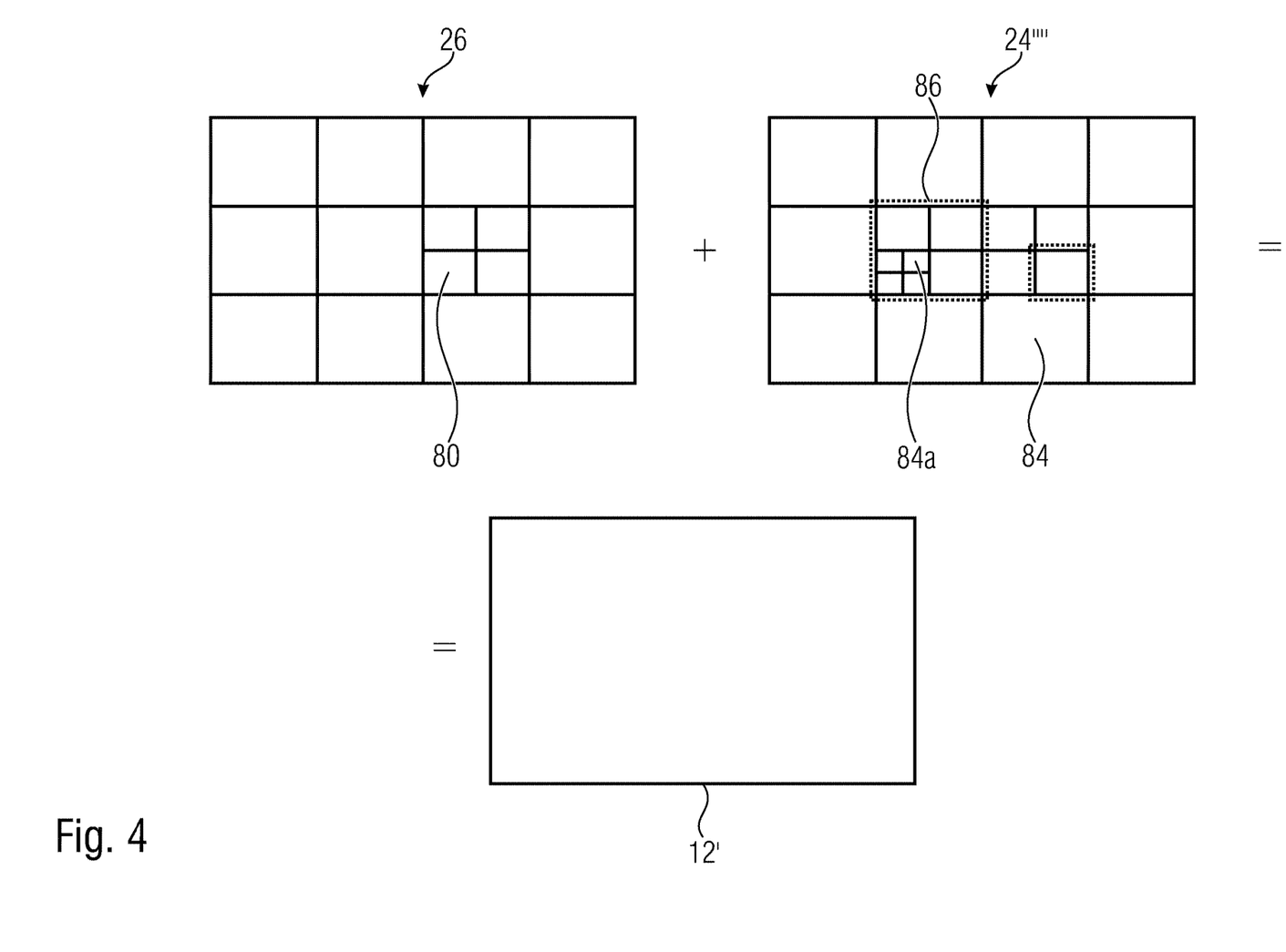
FIG. 4 shows a schematic diagram illustrating an example for a relationship between a prediction residual signal, a prediction signal and a reconstructed signal so as to illustrate possibilities of setting subdivisions for defining the prediction signal, handling the prediction residual signal and the like, respectively.

FIG. 4 illustrates the relationship between the reconstructed signal, i.e. the reconstructed picture 12′, on the one hand, and the combination of the prediction residual signal 24″ as signaled in the data stream, and the prediction signal 26, on the other hand. As already denoted above, the combination may be an addition. The prediction signal 26 is illustrated in FIG. 4 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof is illustrated in FIG. 4 where the picture area is firstly subdivided into rows and columns of tree-root blocks which are then further subdivided in accordance with a recursive multi-tree subdivisioning to result into blocks 80.

The prediction residual signal 24″ in FIG. 4 is also illustrated as a subdivision of the picture area into blocks 84. These blocks might be called transform blocks in order to distinguish same from the coding blocks 80. In effect, FIG. 4 illustrates that encoder 10 and decoder 20 may use two different subdivisions of picture 12 and picture 12′, respectively, into blocks, namely one subdivisioning into coding blocks 80 and another subdivision into blocks 84. Both subdivisions might be the same, i.e. each block 80, may concurrently form a transform block 84 and vice versa, but FIG. 4 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84. However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not the only subdivision used for coding/decoding. These subdivision from a granularity at which prediction signal determination and residual coding is performed, but firstly, the residual coding may alternatively be done without subdivisioning, and secondly, at other granularities than these subdivisions, encoder and decoder may set certain coding parameters which might include some of the aforementioned parameters such as prediction parameters, prediction signal composition control signals and the like.

FIG. 4 illustrates that the combination of the prediction signal 26 and the prediction residual signal 24″″ directly results in the reconstructed signal 12′. However, it should be noted that more than one prediction signal 26 may be combined with the prediction residual signal 24″″ to result into picture 12′ in accordance with alternative embodiments such as prediction signals obtained from other views or from other coding layers which are coded/decoded in a separate prediction loop with separate DPB, for instance.

In FIG. 4, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV

Inverse DCT-IV
Inverse DST-VII
Identity Transformation (IT)

In any case, it should be noted that the set of supported transforms may comprise merely one transform such as one spectral-to-spatial or spatial-to-spectral transform.

As already outlined above, FIGS. 2-4 have been presented as an example where the composed-prediction concept described further below may be implemented in order to form specific examples for video encoders and decoders according to the present application. Insofar, the video encoder and decoder of FIGS. 2 and 3, respectively, represent possible implementations of the video encoders and decoders described herein below. As will be outlined in more detail below, when having the subsequently explained embodiments for composed prediction according to the present application built into the video encoder and decoder of FIGS. 2 and 3, the video encoder of FIG. 2 and the video decoder of FIG. 3 support, at least as one option, to process a block 80 in the manner outlined in more detail below, or even all blocks a current picture 12 is composed of. Thus, the embodiments described hereinafter, inter alias, refer to a video encoder which equals the encoder 10 of FIG. 2 which treats blocks 80 in the manner outlined in more detail below and the same applies with respect to the decoder of FIG. 3 which, thus, represents an example for a video decoder according to an embodiment where blocks 80 are treated in the manner outlined in more detail below. FIGS. 2 and 3 are, however, only specific examples. A video encoder according to embodiments of the present application may, however, perform block-based encoding using the concept outlined in more detail below and being different from the encoder of FIG. 2 such as, for instance, in that the sub-division into blocks 80 is performed in a manner different than exemplified in FIG. 4, or in that this encoder does not use transform prediction residual coding with coding the prediction residual, for instance, in spatial domain directly instead. Likewise, video decoders according to embodiments of the present application may perform decoding from data stream 14 using the composed-prediction coding concept further outlined below, but may differ, for instance, from the decoder 20 of FIG. 3 in that sub-divides picture 12' into blocks in a manner different than described with respect to FIG. 4 and/or in that same does not derive the prediction residual from the data stream 14 in transform domain, but in spatial domain, for instance.

In particular, with respect to the block-subdivisioning into blocks 80, it is noted that same may be done in the manner outlined with respect to FIG. 4 or in a different manner. A subdivisioning into transform blocks, if present, may also be done as described with respect to FIG. 4 or in a different manner. In particular, the subdivisioning into blocks on the one hand and into other blocks on the other hand, such as transform blocks, may be done independent from each other by separately subdividing picture 12 into these blocks, respectively, or in a dependent manner. For instance, one subdivision such as the subdivision into transform blocks, may form an extension of the other subdivision as described above, or both subdivisions may form separate extensions of a common primary subdivision such as, for instance, the subdivision of the picture into an array of tree root blocks as described with respect to FIG. 4. And such possibilities also apply for other sub-picture granularities which will be mentioned below such as with respect to the definition of certain prediction parameters, prediction modes, contribution weights or the like. Different subdivisions may be used for different ones of these entities and same may be defined independent from each other, partially independent or as extensions from one another.

Having said this, the following description concentrates on predicting blocks 80 at encoder and decoder. The aim is to improve the coding efficiency of video using multi-hypotheses with limited memory access bandwidth.

Figure 5:
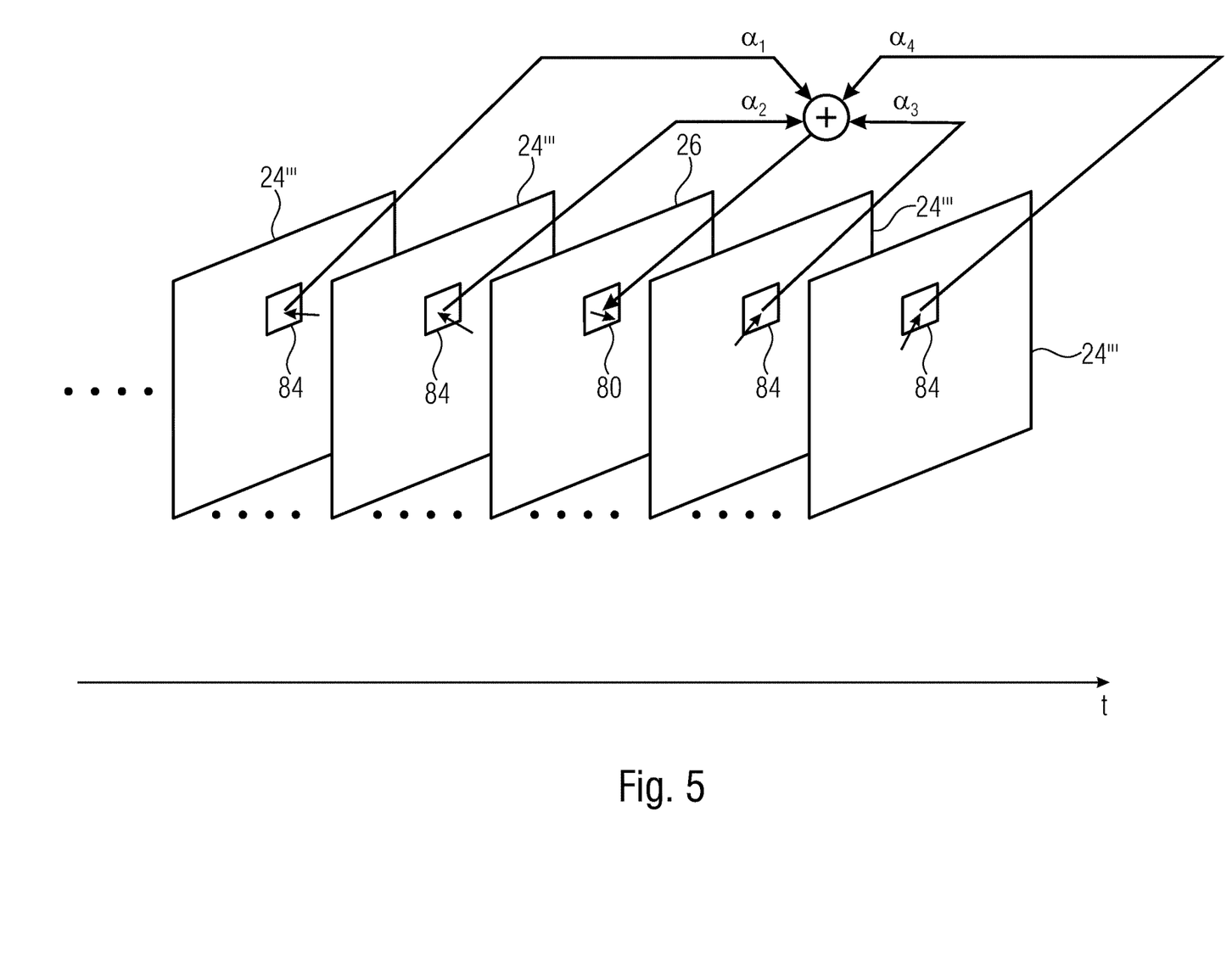
FIG. 5 shows a schematic illustration an example for limiting the average number of prediction hypotheses over a given area according to embodiments of the present application.

In a particular embodiment, the average number of prediction hypotheses over a given area is limited. The area could be, e.g., a fixed number of (neighboring) blocks, a slice, a picture, a group of pictures, or a whole video sequence. For example, if this limit would be equal to three and the area would be a picture, it would be possible to have half of the picture using four prediction hypotheses and the other half using two prediction hypotheses. That is, as shown in FIG. 5, for the prediction block 80, i.e., inter predicted block within a predetermined portion of the video, four blocks 84, i.e., four prediction hypotheses are used. Then, to keep the determined average number of prediction hypotheses three, it is a requirement to use two prediction hypotheses for other prediction block. In this case, a maximum on the number of prediction hypotheses might also be given, e.g., four prediction hypotheses is the maximum.

The number, i.e., the average number, of prediction hypotheses for each inter predicted block may be inserted into the data stream information or on the number of prediction hypotheses for a currently processed inter predicted block dependent on a number of prediction hypotheses of previously processed inter predicted blocks within the predetermined portion and the predetermined criterion.

The information is coded into the data stream based on the number of prediction hypotheses of the previously processed inter predicted blocks within the predetermined portion and the predetermined criterion, determine an allowed number interval, and, using a binarization of the allowed number interval, code the information into the data stream. Furthermore, a maximum of the allowed number interval is the lower, the larger the number of prediction hypotheses of the previously processed inter predicted blocks within the predetermined portion is, and the binarization of the allowed number interval has a mean codeword length which is the lower, the lower the maximum of the allowed number interval is. By doing as mentioned above, it is possible to improve the efficiency of the decoding.

Figure 6:
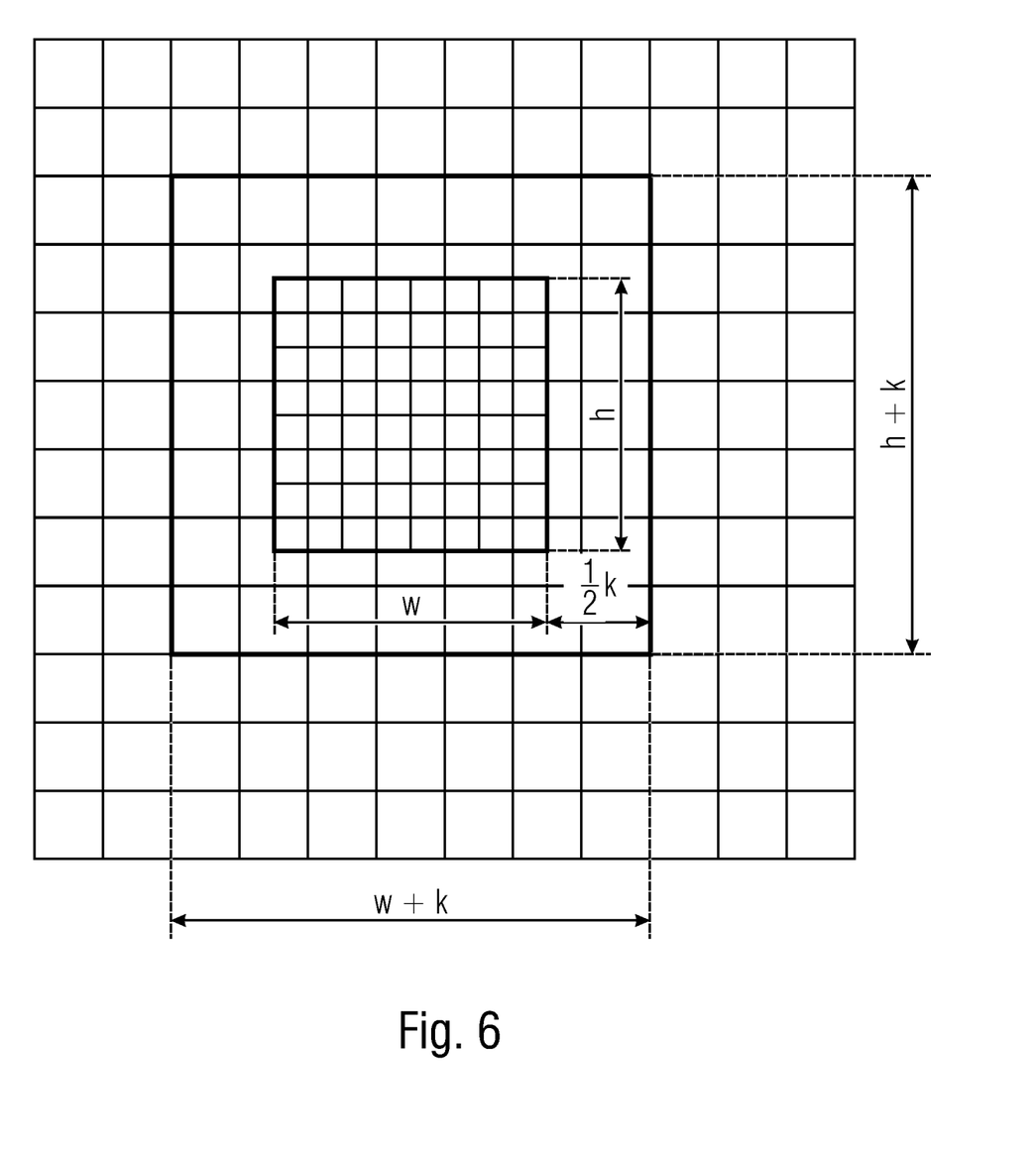
FIG. 6 shows a schematic illustration an example for defining the number of prediction hypotheses depending on the block size or geometry according to embodiments of the present application.

In a further particular embodiment, the number of prediction hypotheses is limited depending on the block size or geometry. It is known that the relative prediction memory access overhead of each prediction hypothesis is higher for smaller blocks. Therefore, by allowing a smaller number of hypotheses for smaller blocks, and a larger number of hypotheses for bigger blocks, thus the overall worst-case memory access bandwidth can be kept constant. That is, the Number of hypotheses is determined by comparing an upper limit for the number N of hypotheses depending on the size or geometry of the predetermined inter predicted block. As an example, as shown in FIG. 6, considering only a single color channel (e.g., luma), in case of a (k+1)-tap interpolation filter, a desired maximum relative prediction memory access overhead m, a block width w and height h, the number of hypotheses N has to fulfill following formula:

$$N \leq (m*w*h)/((w+k_x)*(h+k_y))$$

The Number N determined by using the above formula indicates a maximum number of prediction hypotheses for the predetermined inter prediction blocks within the predetermined portion, i.e., the number an upper bound with respect to the number of hypotheses signalable for the predetermined inter predicted block.

The number of prediction hypotheses for each inter predicted block may be inserted into the data stream information, or based on the size or the geometry of the predetermined inter predicted block, determine an allowed number interval, and, using a binarization of the allowed number interval, code the information into the data stream. The information regarding the number of the prediction hypotheses may indicate a maximum of the allowed number interval is the lower, the smaller the size of the predetermined inter predicted block is, and the binarization of the allowed number interval has a mean codeword length which is the lower, the lower the maximum of the allowed number interval is. In addition, the information may indicate that the number of hypotheses is the larger, the larger the predetermined inter predicted block is. By doing as mentioned above, it is improved decoding efficiency at a decoder.

In a further particular embodiment, different interpolation filters are used for different subsets of the prediction hypotheses. For example, for the first and second (uni/bi-predictive) prediction hypotheses, a longer interpolation filter than for the subsequent hypotheses could be used. By doing so, the relative prediction memory access overhead for the subsequent hypotheses would be reduced. In case that a longer interpolation filter is used for a smaller number of the prediction hypotheses, then, a shorter interpolation filter is used for a larger number of the prediction hypotheses. In other words, dependency between the number of the prediction hypotheses and the size of the interpolation filter is monotonic.

In a further particular embodiment, different motion vector accuracies are used for different subsets of the prediction hypotheses. For example, the first and second (uni/bi-predictive) prediction hypotheses could use quarter-pel motion vector accuracy, whereas the subsequent hypotheses use full-pel accuracy. Consequently, the relative prediction memory access overhead for the subsequent hypotheses would be equal to one per hypothesis. In this case, larger number of the prediction hypothesis, the coarser the motion vector accuracy is used, i.e., the relationship between the number of the prediction hypotheses and the motion vector accuracy is monotonic.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein. A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. Video decoder for decoding a video from a data stream using motion compensated prediction for inter predicted blocks, configured to determine a number of hypotheses for a predetermined inter predicted block dependent on a size or geometry of the block, wherein the number of hypotheses is determined by comparing an upper limit for the number N of hypotheses dependent on $(m*w*h)/((w+k_x)*(h+k_y))$, wherein m is a factor, w is a block width of the predetermined inter predicted block, h is a block height of the predetermined inter predicted block and $k_x$ and $k_y$ indicate the size of an interpolation filter used in the motion compensated prediction.

2. Video decoder according to claim 1, configure so that the number of prediction hypotheses indicates a maximum number of the hypotheses for the inter predicted block (80).

3. Video decoder according to claim 1, configured to insert into the data stream information on the number of prediction hypotheses for the predetermined inter predicted block.

4. Video decoder according to claim 3, configured to, based on the size or the geometry of the predetermined inter predicted block, determine an allowed number interval, and, using a binarization of the allowed number interval, code the information into the data stream.

5. Video decoder according to claim 4, configured so that a maximum of the allowed number interval is the lower, the smaller the size of the predetermined inter predicted block is, and the binarization of the allowed number interval comprises a mean codeword length which is the lower, the lower the maximum of the allowed number interval is.

6. Video decoder according to claim 1, configured so that the number of hypotheses is the larger, the larger the predetermined inter predicted block (80) is.

7. Method for decoding a video from a data stream using motion compensated prediction for inter predicted blocks, comprising determining a number of hypotheses for a predetermined inter predicted block dependent on a size or geometry of the block, wherein the number of hypotheses is determined by comparing an upper limit for the number N of hypotheses dependent on $(m*w*h)/((w+k_x)*(h+k_y))$, wherein m is a factor, w is a block width of the predetermined inter predicted block, h is a block height of the predetermined inter predicted block and $k_x$ and $k_y$ indicate the size of an interpolation filter used in the motion compensated prediction.

8. A non-transitory digital storage medium having a computer program stored thereon to perform the method for decoding a video from a data stream using motion compensated prediction for inter predicted blocks, comprising determining a number of hypotheses for a predetermined inter predicted block dependent on a size or geometry of the block, wherein the number of hypotheses is determined by comparing an upper limit for the number N of hypotheses dependent on $(m*w*h)/((w+k_x)*(h+k_y))$, wherein m is a factor, w is a block width of the predetermined inter predicted block, h is a block height of the predetermined inter predicted block and $k_x$ and $k_y$ indicate the size of an interpolation filter used in the motion compensated prediction, when said computer program is run by a computer.

9. Video encoder for encoding a video into a data stream using motion compensated prediction for inter predicted blocks, configured to determine a number of hypotheses for a predetermined inter predicted block dependent on a size or geometry of the block, wherein the number of hypotheses is determined by comparing an upper limit for the number N of hypotheses dependent on $(m*w*h)/((w+k_x)*(h+k_y))$, wherein m is a factor, w is a block width of the predetermined inter predicted block, h is a block height of the predetermined inter predicted block and $k_x$ and $k_y$ indicate the size of an interpolation filter used in the motion compensated prediction.

* * * * *